US008046219B2

(12) United States Patent
Zurek et al.

(10) Patent No.: US 8,046,219 B2
(45) Date of Patent: Oct. 25, 2011

(54) ROBUST TWO MICROPHONE NOISE SUPPRESSION SYSTEM

(75) Inventors: Robert A. Zurek, Antioch, IL (US); Jeffrey M. Axelrod, Glenview, IL (US); Joel A. Clark, Woodridge, IL (US); Holly L. Francois, Guildford (GB); Scott K. Isabelle, Waukegan, IL (US); David J. Pearce, Basingstoke (GB); James A. Rex, Romsey (GB)

(73) Assignee: Motorola Mobility, Inc., Libertyville, IL (US)

( * ) Notice: Subject to any disclaimer, the term of this patent is extended or adjusted under 35 U.S.C. 154(b) by 993 days.

(21) Appl. No.: 11/874,263

(22) Filed: Oct. 18, 2007 (Under 37 CFR 1.47)

(65) Prior Publication Data

US 2009/0106021 A1 Apr. 23, 2009

(51) Int. Cl.
*G10L 15/20* (2006.01)

(52) U.S. Cl. ........................................ 704/233; 704/226

(58) Field of Classification Search .................. 704/226, 704/233

See application file for complete search history.

(56) References Cited

U.S. PATENT DOCUMENTS

| | | | | |
|---|---|---|---|---|
| 6,167,417 | A | 12/2000 | Parra et al. | |
| 7,106,876 | B2 | 9/2006 | Santiago | |
| 2004/0076305 | A1 | 4/2004 | Santiago | |
| 2004/0158821 | A1 | 8/2004 | Rickard et al. | |
| 2004/0258255 | A1 | 12/2004 | Zhang et al. | |
| 2005/0060142 | A1* | 3/2005 | Visser et al. | 704/201 |
| 2005/0094795 | A1 | 5/2005 | Rambo | |
| 2006/0135085 | A1 | 6/2006 | Chen | |
| 2007/0030982 | A1 | 2/2007 | Jones et al. | |
| 2007/0055507 | A1 | 3/2007 | Jin et al. | |
| 2008/0086260 | A1* | 4/2008 | Lee et al. | 701/200 |
| 2009/0089053 | A1* | 4/2009 | Wang et al. | 704/233 |

FOREIGN PATENT DOCUMENTS

| | | | |
|---|---|---|---|
| KR | 1020050115857 | A | 12/2005 |
| WO | 2004053839 | A1 | 6/2004 |
| WO | 2004083884 | A2 | 9/2004 |

(Continued)

OTHER PUBLICATIONS

Jens Meyer, Microphone Array for Hearing Aids taking into Axxount the Scattering of the Head, Oct. 2001, Media Signal Processing Research Group, pp. 27-30.*

(Continued)

*Primary Examiner* — Jakieda Jackson

(74) *Attorney, Agent, or Firm* — Ellis B. Ramirez; Prass LLP

(57) ABSTRACT

A system, method, and apparatus for separating speech signal from a noisy acoustic environment. The separation process may include directional filtering, blind source separation, and dual input spectral subtraction noise suppressor. The input channels may include two omnidirectional microphones whose output is processed using phase delay filtering to form speech and noise beamforms. Further, the beamforms may be frequency corrected. The omnidirectional microphones generate one channel that is substantially only noise, and another channel that is a combination of noise and speech. A blind source separation algorithm augments the directional separation through statistical techniques. The noise signal and speech signal are then used to set process characteristics at a dual input noise spectral subtraction suppressor (DINS) to efficiently reduce or eliminate the noise component. In this way, the noise is effectively removed from the combination signal to generate a good qualify speech signal.

37 Claims, 8 Drawing Sheets

FOREIGN PATENT DOCUMENTS

| | | | |
|---|---|---|---|
| WO | WO2004114644 | A2 | 12/2004 |
| WO | 2007106399 | A2 | 9/2007 |

OTHER PUBLICATIONS

C. Fancourt and L. Parra, "The Generalized Sidelobe Decorrelator", in Proc. IEEE Workshop on Applications of Signal Processing to Audio and Acoustics, 2001.
E. Visser, M. Otsuka, T-W. Lee; "A Spatio-Temporal Speech Enhancement Scheme for Robust Speech Recognition"; International Conference on Spoken Language Processing, 1821-1824, Denver, Sep. 2002.
Ivan Tashev, Michael Seltzer, Alex Acero; "Microphone Array for Headset With Spatial Noise Suppressor"; Proceedings of Ninth International Workshop on Acoustic, Echo and Noise Control IWAENC 2005, Eindhoven, The Netherlands, Sep. 2005.
Erik Visser et al.; Application Of Blind Source Separation In Speech Processing For Combined Interference Removal and Robust Speaker Detection Using A Two-Microphone Setup; 4th International Symposium on Independent Component Analysis and Blind Signal Separation (ICA2003), Nara, Japan; pp. 325-329, Apr. 2003.
Y H. Saruwatari et al.; Blind Source Separation Based on a Fast-Convergence Algorithm Combining ICA and Beamforming; IEEE Transactions on Audio, Speech, and Language Processing, vol. 14, No. 2, pp. 666-678, Mar. 2006.
Partial European Search Report Issued Jun. 8, 2010.
Supplementary European Search Report Issued Sep. 29, 2010.
Extended EP Search Report dated Oct. 6, 2010.
Extended EP Search Report dated Sep. 16, 2010.
Partial EP Search Report dated Jun. 15, 2010.

* cited by examiner

ROBUST TWO MICROPHONE NOISE SUPPRESSION SYSTEM

BACKGROUND OF THE INVENTION

1. Field of the Invention

The present invention relates to systems and methods for processing multiple acoustic signals, and more particularly to separating the acoustic signals through filtering.

2. Introduction

Detecting and reacting to an informational signal in a noisy environment is often difficult. In communication where users often talk in noisy environments, it is desirable to separate the user's speech signals from background noise. Background noise may include numerous noise signals generated by the general environment, signals generated by background conversations of other people, as well as reflections, and reverberation generated from each of the signals.

In noisy environments uplink communication can be a serious problem. Most solutions to this noise issue only either work on certain types of noise such as stationary noise, or produce significant audio artifacts that can be as annoying to the user as a noisy signal. All existing solutions have drawbacks concerning source and noise location, and noise type that is trying to be suppressed.

It is the object of this invention to provide a means that will suppress all noise sources independent of their temporal characteristics, location, or movement.

SUMMARY OF THE INVENTION

A system, method, and apparatus for separating a speech signal from a noisy acoustic environment. The separation process may include source filtering which may be directional filtering (beamforming), blind source separation, and dual input spectral subtraction noise suppression. The input channels may include two omnidirectional microphones whose output is processed using phase delay filtering to form speech and noise beamforms. Further, the beamforms may be frequency corrected. The beamforming operation generates one channel that is substantially only noise, and another channel that is a combination of noise and speech. A blind source separation algorithm augments the directional separation through statistical techniques. The noise signal and speech signal are then used to set process characteristics at a dual input spectral subtraction noise suppressor (DINS) to efficiently reduce or eliminate the noise component. In this way, the noise is effectively removed from the combination signal to generate a good quality speech signal.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

Figure 1:
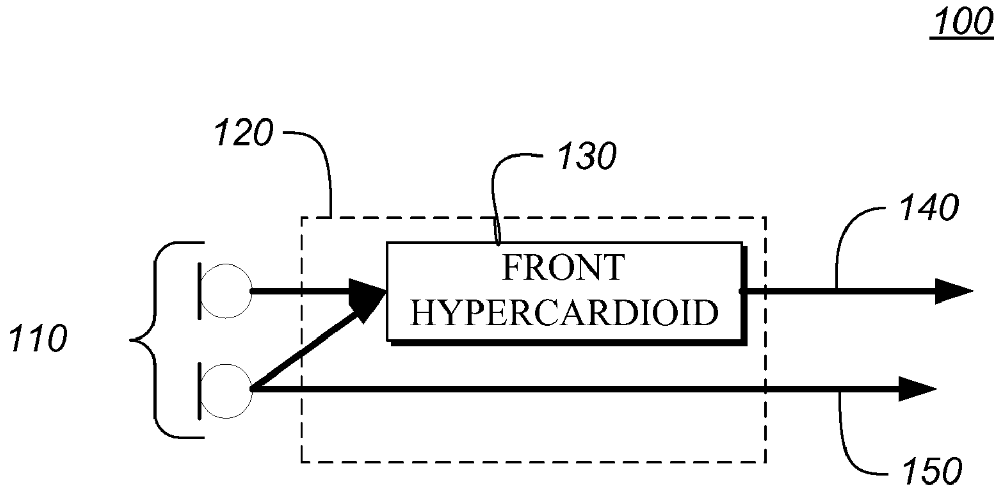
FIG. 1 is a perspective view of a beamformer employing a front hypercardioid directional filter to form noise and speech beamforms from two omnidirectional microphones.

FIG. 1 illustrates an exemplary diagram of a beamformer 100 for forming noise and speech beamforms from two omnidirectional microphones in accordance with a possible embodiment of the invention. The two microphones 110 are spaced apart from one another. Each microphone may receive a direct or indirect input signal and may output a signal. The two microphones 110 are omnidirectional so they receive sound almost equally from all directions relative to the microphone. The microphones 110 may receive acoustic signals or energy representing mixtures of speech and noise sounds and these inputs may be converted into first signal 140 that is predominantly speech and a second signal 150 having speech and noise. While not shown the microphones may include an internal or external analog-to-digital converter. The signals from the microphones 110 may be scaled or transformed between the time and the frequency domain through the use of one or more transform functions. The beamforming may compensate for the different propagation times of the different signals received by the microphones 110. As shown in FIG. 1 the outputs of the microphones are processed using source filtering or directional filtering 120 so as to frequency response correct the signals from the microphones 110.

Figure 2:
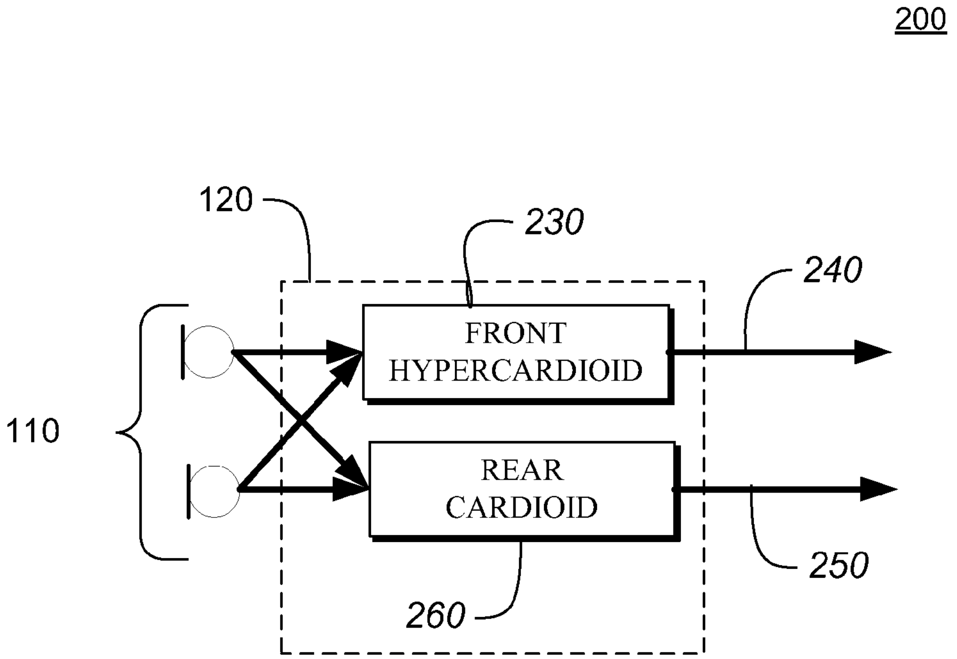
FIG. 2 is a perspective view of a beamformer employing a front hypercardioid directional filter and a rear cardioid directional filter to form noise and speech beamforms from two omnidirectional microphones.

Beamformer 100 employs a front hypercardioid directional filter 130 to further filter the signals from microphones 110. In one embodiment the directional filter would have amplitude and phase delay values that vary with frequency to form the ideal beamform across all frequencies. These values may be different from the ideal values that microphones placed in free space would require. The difference would take into account the geometry of the physical housing in which the microphones are placed. In this method the time difference between signals due to spatial difference of microphones 110 is used to enhance the signal. More particularly, it is likely that one of the microphones 110 will be closer in proximity to the speech source (speaker), whereas the other microphone may generate a signal that is relatively attenuated. FIG. 2 illustrates an exemplary diagram of a beamformer 200 for forming noise 250 and speech beamforms 240 from two omnidirectional microphones in accordance with a possible embodiment of the invention. Beamformer 200 adds a rear cardioid directional filter 260 to further filter the signals from microphones 110.

The omnidirectional microphones 110 receive sound signals approximately equally from any direction around the microphone. The sensing pattern (not shown) shows approximately equal amplitude received signal power from all directions around the microphone. Thus, the electrical output from the microphone is the same regardless of from which direction the sound reaches the microphone.

The front hypercardioid 230 sensing pattern provides a narrower angle of primary sensitivity as compared to the cardioid pattern. Furthermore, the hypercardioid pattern has two points of minimum sensitivity, located at approximately +−140 degrees from the front. As such, the hypercardioid pattern suppresses sound received from both the sides and the rear of the microphone. Therefore, hypercardioid patterns are best suited for isolating instruments and vocalists from both the room ambience and each other.

The rear facing cardioid or rear cardioid 260 sensing pattern (not shown) is directional, providing full sensitivity when the sound source is at the rear of the microphone pair. Sound received at the sides of the microphone pair has about half of the output, and sound appearing at the front of the microphone pair is substantially attenuated. This rear cardioid pattern is created such that the null of the virtual microphone is pointed at the desired speech source (speaker).

In all cases, the beams are formed by filtering one omnidirectional microphone with a phase delay filter, the output of which is then summed with the other omnidirectional microphone signal to set the null locations, and then a correction filter to correct the frequency response of the resulting signal. Separate filters, containing the appropriate frequency-dependent delay are used to create Cardioid 260 and Hypercardioid 230 responses. Alternatively, the beams could be created by first creating forward and rearward facing cardioid beams using the aforementioned process, summing the cardioid signal to create a virtual omnidirectional signal, and taking the difference of the signals to create a bidirectional or dipole filter. The virtual omnidirectional and dipole signals are combined using equation 1 to create a Hypercardioid response.

$$\text{Hypercardioid}=0.25*(\text{omni}+3*\text{dipole}) \quad \text{EQ. 1}$$

An alternative embodiment would utilize fixed directivity single element Hypercardioid and Cardioid microphone capsules. This would eliminate the need for the beamforming step in the signal processing, but would limit the adaptability of the system, in that the variation of beamform from one use-mode in the device to another would be more difficult, and a true omnidirectional signal would not be available for other processing in the device. In this embodiment the source filter could either be a frequency corrective filter, or a simple filter with a passband that reduces out of band noise such as a high pass filter, a low pass antialiasing filter, or a bandpass filter.

Figure 3:
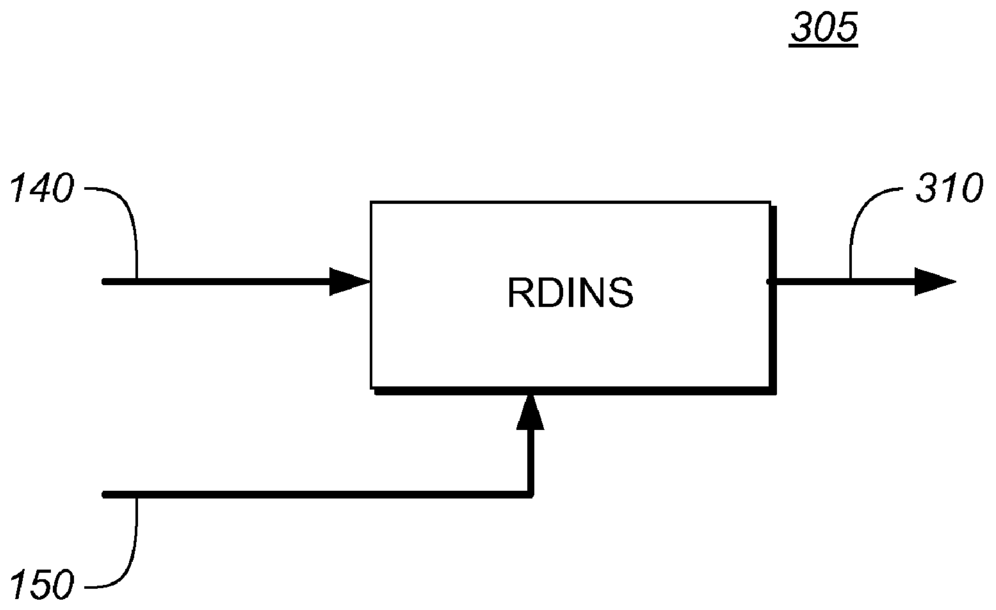
FIG. 3 is a block diagram of a robust dual input spectral subtraction noise suppressor (RDINS) in accordance with a possible embodiment of the invention.

FIG. 3 illustrates an exemplary diagram of a robust dual input spectral subtraction noise suppressor (RDINS) in accordance with a possible embodiment of the invention. The speech estimate signal 240 and the noise estimate signal 250 are fed as inputs to RDINS 305 to exploit the differences in the spectral characteristics of speech and noise to suppress the noise component of speech signal 140. The algorithm for RDINS 305 is better explained with reference to methods 600 to 800.

Figure 4:
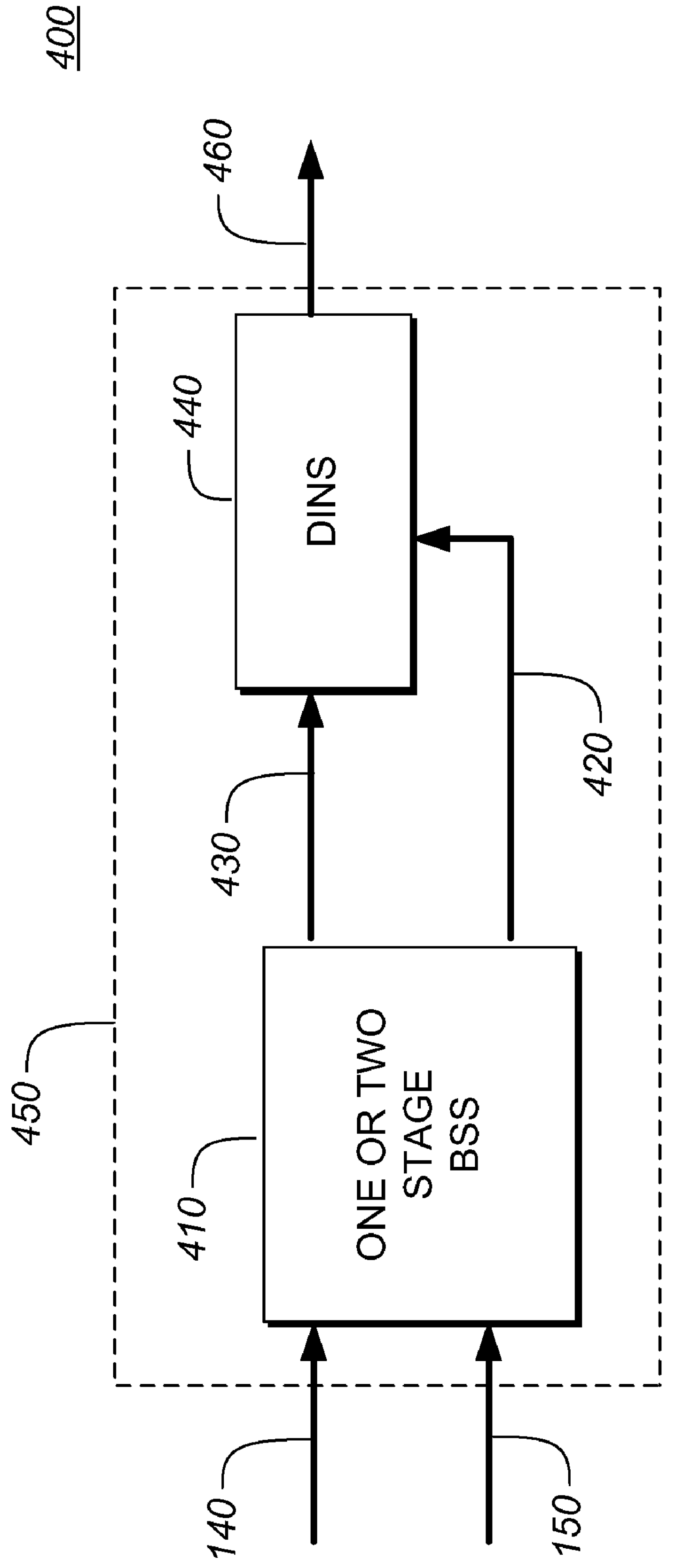
FIG. 4 is a block diagram of a blind source separation (BSS) filter and dual input spectral subtraction noise suppressor (DINS) in accordance with a possible embodiment of the invention.

FIG. 4 illustrates an exemplary diagram for a noise suppression system 400 that uses a blind source separation (BSS) filter and dual input spectral subtraction noise suppressor (DINS) to process the speech 140 and noise 150 beamforms. The noise and speech beamforms have been frequency response corrected. The blind source separation (BSS) filter 410 removes the remaining speech signal from the noise signal. The BSS filter 410 can produce a refined noise signal only 420 or refined noise and speech signals (420, 430). The BSS can be a single stage BSS filter having two inputs (speech and noise) and the desired number of outputs. A two stage BSS filter would have two BSS stages cascaded or connected together with the desired number of outputs. The blind source separation filter separates mixed source signals which are presumed statistically independent from each other. The blind source separation filter 410 applies an unmixing matrix of weights to the mixed signals by multiplying the matrix with the mixed signals to produce separated signals. The weights in the matrix are assigned initial values and adjusted in order to minimize information redundancy. This adjustment is repeated until the information redundancy of the output signals 420, 430 is reduced to a minimum. Because this technique does not require information on the source of each signal, it is referred to as blind source separation. The BSS filter 410 statistically removes speech from noise so as to produce reduced-speech noise signal 420. The DINS unit 440 uses the reduced-speech noise signal 420 to remove noise from speech 430 so as to produce a speech signal 460 that is substantially noise free. The DINS unit 440 and BSS filter 410 can be integrated as a single unit 450 or can be separated as discrete components.

The speech signal 140 provided by the processed signals from microphones 110 are passed as input to the blind source separation filter 410, in which a processed speech signal 430 and noise signal 420 is output to DINS 440, with the processed speech signal 430 consisting completely or at least essentially of a user's voice which has been separated from the ambient sound (noise) by action of the blind source separation algorithm carried out in the BSS filter 410. Such BSS signal processing utilizes the fact that the sound mixtures picked up by the microphone oriented towards the environment and the microphone oriented towards the speaker consist of different mixtures of the ambient sound and the user's voice, which are different regarding amplitude ratio of these two signal contributions or sources and regarding phase difference of these two signal contributions of the mixture.

The DINS unit 440 further enhances the processed speech signal 430 and noise signal 420, the noise signal 420 is used as the noise estimate of the DINS unit 440. The resulting noise estimate 420 should contain a highly reduced speech signal since remains of the desired speech 460 signal will be disadvantageous to the speech enhancement procedure and will thus lower the quality of the output.

Figure 5:
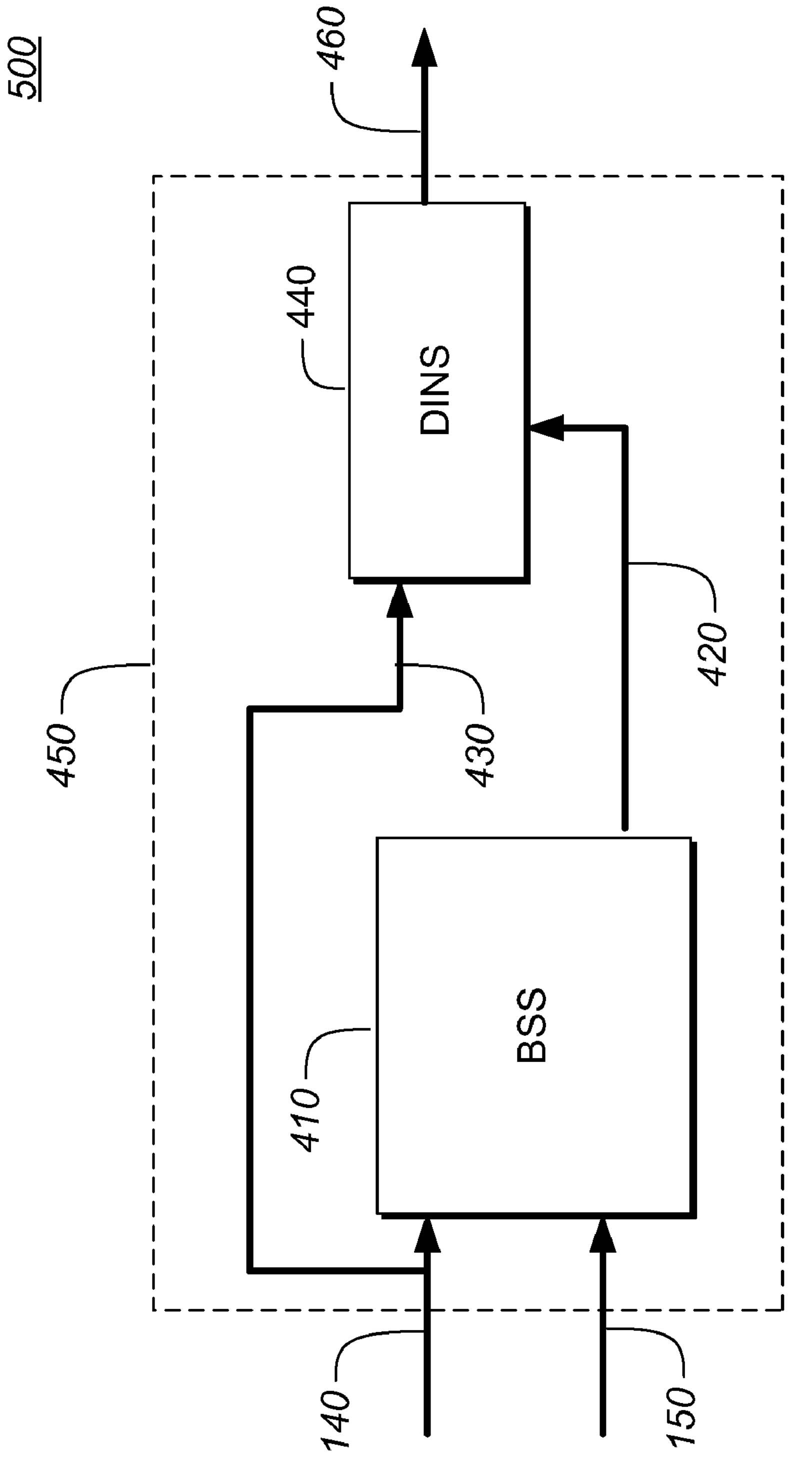
FIG. 5 is a block diagram of a blind source separation (BSS) filter and dual input spectral subtraction noise suppressor (DINS) that bypasses the speech output of the BSS in accordance with a possible embodiment of the invention.

FIG. 5 illustrates an exemplary diagram for a noise suppression system 500 that uses a blind source separation (BSS) filter and dual input spectral subtraction noise suppressor (DINS) to process the speech 140 and noise 150 beamforms. The noise estimate of DINS unit 440 is still the processed noise signal from BSS filter 410. The speech signal 430, however, is not processed by the BSS filter 410.

Figure 6:
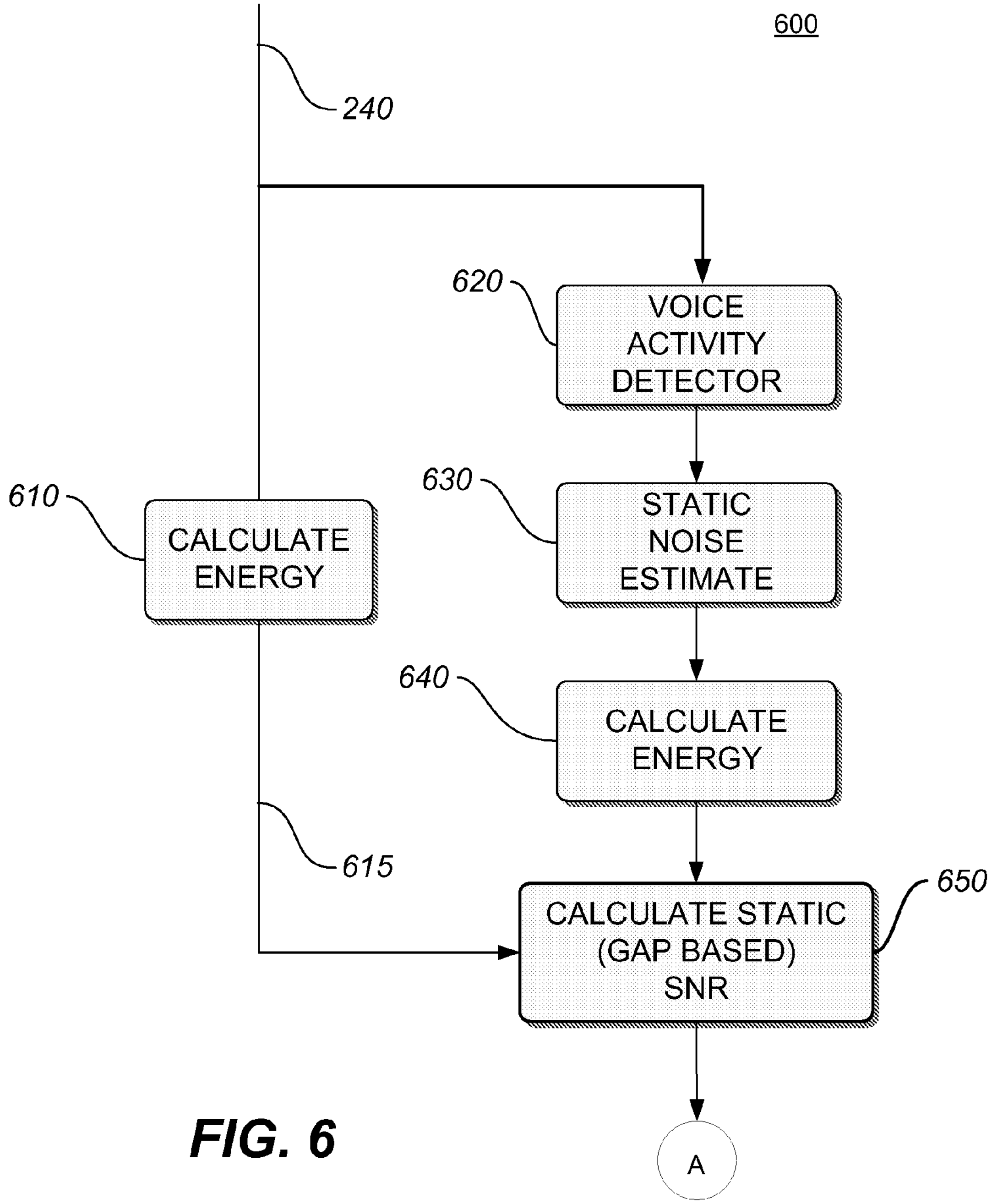
FIG. 6 is a flowchart of a method for static noise estimation in accordance with a possible embodiment of the invention.
Figure 7:
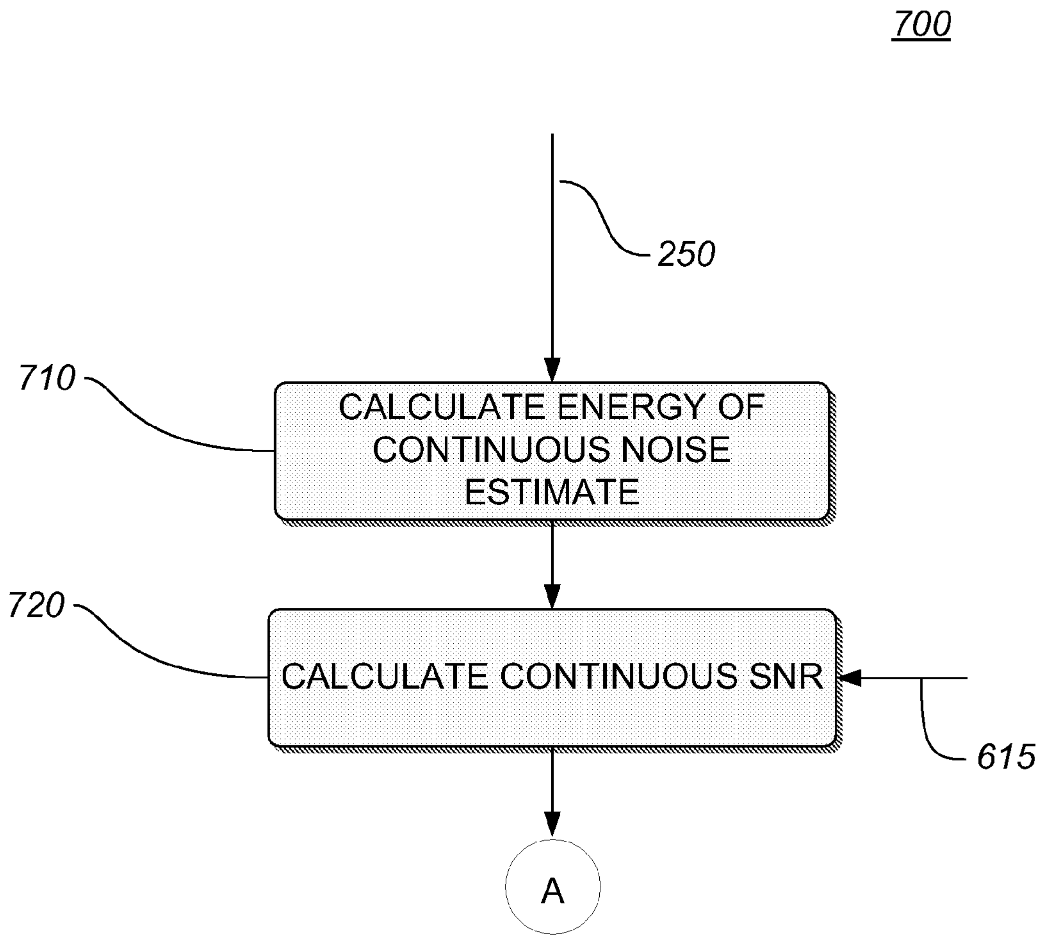
FIG. 7 is a flowchart of a method for continuous noise estimation in accordance with a possible embodiment of the invention.
Figure 8:
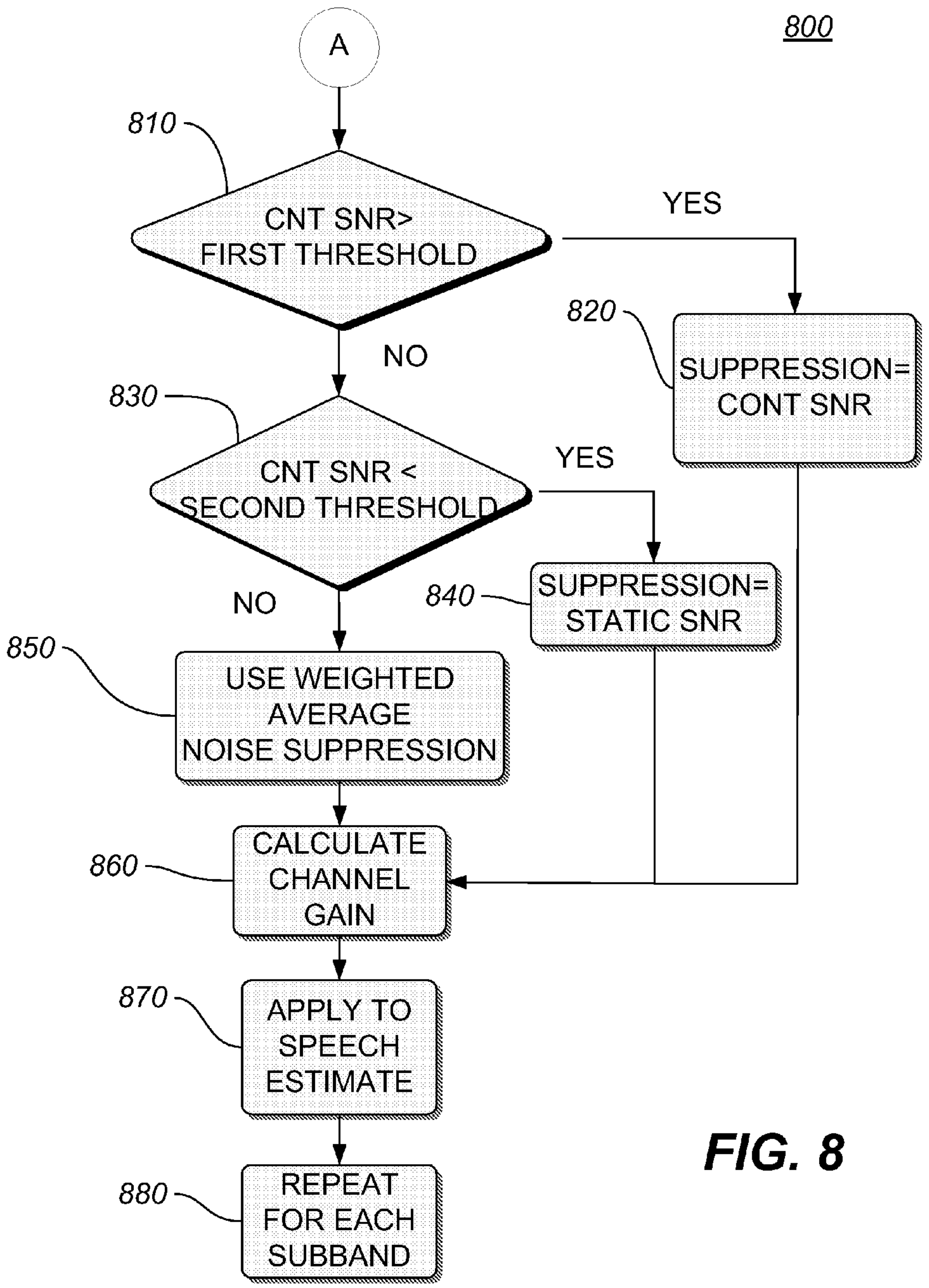
FIG. 8 is a flowchart of a method for robust dual input spectral subtraction noise suppressor (RDINS) in accordance with a possible embodiment of the invention.

FIGS. 6-8 are exemplary flowcharts illustrating some of the basic steps for determining static noise estimates for a robust dual input spectral subtraction noise suppressor (RDINS) method in accordance with a possible embodiment of the disclosure.

When BSS is not used the output of the directional filtering (240, 250) can be applied directly to the dual channel noise suppressor (DINS), unfortunately the rear facing cardioid pattern 260 only places a partial null on the desired talker, which results in only 3 dB to 6 dB suppression of the desired talker in the noise estimate. For the DINS unit 440 on its own this amount of speech leakage causes unacceptable distortion to the speech after it has been processed. The RDINS is a version of the DINS designed to be more robust to this speech leakage in the noise estimate 250. This robustness is achieved by using two separate noise estimates; one is the continuous noise estimate from the directional filtering and the other is the static noise estimate that could also be used in a single channel noise suppressor.

Method 600 uses the speech beam 240. A continuous speech estimate is obtained from the speech beam 240, the estimate is obtained during both speech and speech free-intervals. The energy level of the speech estimate is calculated in step 610. In step 620, a voice activity detector is used to find the speech-free intervals in the speech estimate for each frame. In step 630, a smoothed static noise estimate is formed from the speech-free intervals in the speech estimate. This static noise estimate will contain no speech as it is frozen for the duration of the desired input speech; however this means that the noise estimate does not capture changes during non-stationary noise. In step 640, the energy of the static noise estimate is calculated. In step 650, a static signal to noise ratio is calculated from the energy of the continuous speech signal 615 and the energy of the static noise estimate. The steps 620 through 650 are repeated for each subband.

Method 700 uses the continuous noise estimate 250. In step 710, a continuous noise estimate is obtained from the noise beam 250, the estimate is obtained during both speech and speech free-intervals. This continuous noise estimate 250 will contain speech leakage from the desired talker due to the imperfect null. In step 720, the energy is calculated for the noise estimate for the subband. In step 730, the continuous signal to noise ratio is calculated for the subband.

Method 800 uses the calculated signal to noise ratio of the continuous noise estimate and the calculated signal to noise ratio of the static noise estimate to determine the noise suppression to use. In step 810, if the continuous SNR is greater than a first threshold, control is passed to step 820 where the suppression is set equal to the continuous SNR. If in step 810 the continuous SNR is not greater than a first threshold, control passes to action 830. In action 830, if the continuous SNR is less than a second threshold, control passes to step 840 where suppression is set to the static SNR. If the continuous SNR is not less than the second threshold, then control passes to step 850 where a weighted average noise suppressor is used. The weighted average is the average of the static and continuous SNR. For lower SNR sub-bands (no/weak speech relative to the noise) the continuous noise estimate is used to determine the amount of suppression so that it is effective during non-stationary noise. For higher SNR sub-bands (strong speech relative to the noise), when the leakage will dominate in the continuous noise estimate, use the static noise estimate to determine the amount of suppression to prevent the speech leakage causing over suppression and distorting the speech. During medium SNR sub-bands combine the two estimates to give a soft switch transition between the above two cases. In step 860 the channel gain is calculated. In step 870, the channel gain is applied to the speech estimate. The steps are repeated for each subband. The channel gains are then applied in the same way as for the DINS so that the channels that have a high SNR are passed while those with a low SNR are attenuated. In this implementation the speech waveform is reconstructed by overlap add of windowed Inverse FFT.

In practice a two way communication device may contain multiple embodiments of this invention which are switched between depending on the usage mode. For example a beamforming operation described in FIG. 1 may be combined with the BSS stage and DINS described in FIG. 4 for a close-talking or private mode use case, while in a handsfree or speakerphone mode the beamformer of FIG. 2 may be combined with the RDINS of FIG. 3. Switching between these modes of operation could be triggered by one of many implementations known in the art. By way of example, and not limitation, the switching method could be via a logic decision based on proximity, a magnetic or electrical switch, or any equivalent method not described herein.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the method and devices in FIGS. 1-8 each processing the content in various possible ways. It does not necessarily need to be one system used by all end users. Accordingly, the appended claims and their legal equivalents should only define the invention, rather than any specific examples given.

We claim:

1. A system for noise reduction by separating a speech signal from a noisy acoustic environment, the system comprising:

a plurality of input channels each receiving one or more acoustic signals;

at least one source filter coupled to the plurality of input channels to separate the one or more acoustic signals into speech and noise beams;

at least one blind source separation (BSS) filter, wherein the blind source separation filter is operable to refine the speech and noise beams; and at least one dual input spectral subtraction noise suppressor (DINS), wherein the dual input spectral subtraction noise suppressor removes noise from the speech beam.

2. The system of claim 1, wherein the source filter uses phase delay filtering to form speech and noise beams.

3. The system of claim 2, wherein speech and noise beams are frequency response corrected by the source filter.

4. The system of claim 1, wherein the refined speech and noise beams from the blind source separation (BSS) filter are fed into dual input spectral subtraction noise suppressor (DINS).

5. The system of claim 1, wherein the refined noise beam from the blind source separation (BSS) filter and the speech beam from a source filter are fed into the dual input spectral subtraction noise suppressor (DINS).

6. The system of claim 1, the system further comprising:

cascading two blind source separation (BSS) filters;

wherein the input to the cascade is the speech and noise beams from the source filter;

wherein the output of the cascade is fed into the dual input spectral subtraction noise suppressor (DINS).

7. A system for noise reduction, the system comprising:

a plurality of omnidirectional microphones each receiving one or more acoustic signals;

a first directional filter for producing a speech estimate signal from the received one or more acoustic signals;

a second directional filter for producing a noise estimate signal from the received one or more acoustic signals; and at least one robust dual input spectral subtraction noise suppressor (RDINS) for producing a noise reduced speech signal from the produced speech estimate signal and the produced noise estimate signal.

8. The system of claim 7, wherein the first directional filter produces a hypercardioid response; and wherein the second directional filter produces a cardioid response.

9. The system of claim 7, wherein the robust dual input spectral subtraction noise suppressor (RDINS) calculates a static noise estimate from the speech estimate signal; and wherein the robust dual input spectral subtraction noise suppressor (RDINS) calculates a continuous noise estimate from the noise estimate signal.

10. The system of claim 9, wherein the robust dual input spectral subtraction noise suppressor (RDINS) employs the continuous noise estimate when the continuous noise estimate signal to noise ratio is above a first threshold.

11. The system of claim 10, wherein the robust dual input spectral subtraction noise suppressor (RDINS) employs the static noise estimate when the continuous noise estimate signal to noise ratio is below a second threshold.

12. The system of claim 11, wherein the robust dual input spectral subtraction noise suppressor (RDINS) employs a weighted average noise estimate when the continuous noise estimate signal to noise ratio is above the second threshold but below the first threshold.

13. An electronic device with noise reduction, comprising:

a pair of omnidirectional microphones for receiving one or more acoustic signals; wherein the signal from the omnidirectional microphones are categorized as predominantly speech signal and predominantly noise signal; and at least one signal processor for processing the predominantly speech signal and the predominantly noise signal to produce noise suppressed speech signal comprising:

at least one source filter to separate the one or more acoustic signals into speech and noise beams;

at least one blind source separation (BSS) filter, wherein the blind source separation filter is operable to refine the speech and noise beams;

at least one dual input spectral subtraction noise suppressor (DINS) to produce a speech signal that is substantially noise free by processing the refined speech beam and noise beam with one of the separated speech and noise beams from the at least one source filter.

14. The electronic device of claim 13, wherein the source filter uses phase delay filtering to form speech and noise beams.

15. The electronic device of claim 14, wherein speech and noise beams are frequency response corrected by the source filter.

16. The electronic device of claim 13, wherein the refined speech and noise beams from the blind source separation (BSS) filter are fed into the dual input spectral subtraction noise suppressor (DINS).

17. The electronic device of claim 13, wherein the refined noise beam from the blind source separation (BSS) filter and the speech beam from source filter are fed into the dual input spectral subtraction noise suppressor (DINS).

18. The electronic device of claim 13, the system further comprising:

cascading two blind source separation (BSS) filters;

wherein the input to the cascade is the speech and noise beams from the source filter;

wherein the output of the cascade is fed into the dual input spectral subtraction noise suppressor (DINS).

19. The electronic device of claim 13, wherein the speech estimate is produced by a front hypercardioid pattern; and wherein the noise estimate is produced by a rear cardioid pattern.

20. The electronic device of claim 19, the at least one signal processor further comprising:

at least one robust dual input spectral subtraction noise suppressor (RDINS) for producing a noise reduced speech signal from the produced speech estimate signal and the noise estimate signal.

21. The electronic device of claim 20, wherein the robust dual input spectral subtraction noise suppressor (RDINS) calculates a continuous noise estimate from the noise estimate signal.

22. The electronic device of claim 21, wherein the robust dual input spectral subtraction noise suppressor (RDINS) calculates a static noise estimate from the speech estimate signal.

23. The electronic device of claim 22, wherein the robust dual input spectral subtraction noise suppressor (RDINS) employs the continuous noise estimate when the continuous noise estimate signal to noise ratio is above a first threshold.

24. The electronic device of claim 23, wherein the robust dual input spectral subtraction noise suppressor (RDINS) employs the static noise estimate when the continuous noise estimate signal to noise ratio is below a second threshold.

25. The electronic device of claim 24, wherein the robust dual input spectral subtraction noise suppressor (RDINS) employs a weighted average noise estimate when the continuous noise estimate signal to noise ratio is above the second threshold but below the first threshold.

26. A method for noise reduction, the method comprising:

receiving one or more acoustic signals from a plurality of input channels;

separating with a source filter the one or more acoustic signals received from the plurality of input channels into speech and noise beams, wherein the source filter comprises at least one hypercardioid directional filter to produce a speech beam from the received one or more acoustic signals;

refining the speech and noise beams by employing at least one blind source separation (BSS) filter, wherein the blind source separation filter is operable to refine the speech and noise beams; and producing through at least one dual input spectral subtraction noise suppressor (DINS) a speech signal that is substantially noise free by processing the refined speech beam and noise beam with one of the separated speech and noise beams from the source filter.

27. The method of claim 26, wherein the separating at the source filter is through phase delay filtering.

28. The method of claim 27, wherein speech and noise beams are frequency response corrected.

29. The method of claim 26, wherein the refined speech and noise beams from the blind source separation (BSS) filter are fed into the dual input spectral subtraction noise suppressor (DINS).

30. The method of claim 26, wherein the refined noise beam from the blind source separation (BSS) filter and the speech beam from the source filter are fed into the dual input spectral subtraction noise suppressor (DINS).

31. The method of claim 26, the method further comprising:

cascading two blind source separation (BSS) filters;

wherein the input to the cascade is the speech and noise beams from the source filter;

wherein the output of the cascade is fed into the dual input spectral subtraction noise suppressor (DINS).

32. A method for noise reduction, the method comprising:

receiving one or more acoustic signals at a plurality of omnidirectional microphones;

producing a speech estimate signal by use of a directional filter that produces a hypercardioid response from the one or more acoustic signals received at the plurality of omnidirectional microphones;

producing a noise estimate signal from the hypercardioid response of the one or more acoustic signals received at the plurality of omnidirectional microphones; and producing a reduced noise speech signal from the speech estimate signal and the noise estimate signal by use of a robust dual input spectral subtraction noise suppressor (RDINS).

33. The method of claim 32, wherein the robust dual input spectral subtraction noise suppressor (RDINS) calculates a continuous noise estimate from the noise estimate signal.

34. The method of claim 33, wherein the robust dual input spectral subtraction noise suppressor (RDINS) calculates a static noise estimate from the speech estimate signal.

35. The method of claim 34, wherein the robust dual input spectral subtraction noise suppressor (RDINS) employs the continuous noise estimate when the continuous noise estimate signal to noise ratio is above a first threshold.

36. The method of claim 35, wherein the robust dual input spectral subtraction noise suppressor (RDINS) employs the static noise estimate when the continuous noise estimate signal to noise ratio is below a second threshold.

37. The method of claim 36, wherein the robust dual input spectral subtraction noise suppressor (RDINS) employs a weighted average noise estimate when the continuous noise estimate signal to noise ratio is above the second threshold but below the first threshold.

* * * * *